United States Patent
Clausen et al.

(10) Patent No.: US 8,457,218 B2
(45) Date of Patent: *Jun. 4, 2013

(54) PROTECTION OF COMMUNICATION SYSTEMS AGAINST REPETITIVE ELECTRICAL IMPULSE NOISE

(75) Inventors: Axel Clausen, Munich (DE); Vladimir Oksman, Morganville, NJ (US)

(73) Assignee: Lantiq Deutschland GmbH, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/267,230

(22) Filed: Oct. 6, 2011

(65) Prior Publication Data

US 2012/0027069 A1 Feb. 2, 2012

Related U.S. Application Data

(63) Continuation of application No. 11/697,893, filed on Apr. 9, 2007, now Pat. No. 8,064,504.

(51) Int. Cl.
H04L 27/00 (2006.01)

(52) U.S. Cl.
USPC ........... 375/259; 375/222; 375/220; 375/227; 375/256; 375/296; 375/346

(58) Field of Classification Search
USPC .............. 375/259, 222, 220, 227, 256, 296, 375/346
See application file for complete search history.

(56) References Cited

U.S. PATENT DOCUMENTS

| | | |
|---|---|---|
| 4,845,466 A | 7/1989 | Hariton et al. |
| 5,265,151 A | 11/1993 | Goldstein |
| 5,703,904 A | 12/1997 | Langberg |
| 7,411,998 B1 | 8/2008 | Cole |
| 2003/0128669 A1 | 7/2003 | Lacey, III |
| 2006/0056305 A1 | 3/2006 | Oksman et al. |
| 2006/0078044 A1 | 4/2006 | Norrell et al. |
| 2006/0282750 A1 | 12/2006 | Takeuchi |
| 2007/0230548 A1 | 10/2007 | Van de Wiel et al. |
| 2008/0232444 A1 | 9/2008 | Tzannes |

FOREIGN PATENT DOCUMENTS

WO 2005086405 A2 9/2005

OTHER PUBLICATIONS

Non-Final Office Action Dated Mar. 3, 2010 for U.S. Appl. No. 11/697,893.
Non-Final Office Action Dated Oct. 12, 2010 for U.S. Appl. No. 11/697,893.
Non-Final Office Action Dated Mar. 31, 2011 for U.S. Appl. No. 11/697,893.
Notice of Allowance Dated Sep. 16, 2011 for U.S. Appl. No. 11/697,893.
European Search Report for Application No. 07008001.5 dated Dec. 22, 2009.
Okamura Y., et al., "ADSL System for Time Periodic Noise Environments", NEC Research and Development, Nippon Electric Ltd., Tokyo, JP, vol. 40, No. 1, Jan. 1, 1999, 6 pages.
Cioffi, John M., "A Multicarrier Primer", reprinted from the Internet at: http://www-isl.stanford.edu/~cioffi/papers.html, 18 pages.

*Primary Examiner* — Kabir A Timory
(74) *Attorney, Agent, or Firm* — Eschweiler & Associates, LLC

(57) ABSTRACT

A method limits the effect of repetitive electrical impulse noise in a communication system. The presence of the repetitive electrical impulse noise is detected during communication service. If the repetitive electrical impulse noise is detected, then a message is transmitted which signals that the repetitive electrical impulse noise is present. Other systems and methods are disclosed.

19 Claims, 8 Drawing Sheets

PROTECTION OF COMMUNICATION SYSTEMS AGAINST REPETITIVE ELECTRICAL IMPULSE NOISE

RELATED APPLICATION

This application is a continuation of U.S. application Ser. No. 11/697,893, filed Apr. 9, 2007, now U.S. Pat. No. 8,064,504, which claims priority to U.S. Provisional Application Ser. No. 60/793,570 filed Apr. 21, 2006, entitled "PROTECTION OF COMMUNICATION SYSTEMS AGAINST REPETITIVE ELECTRICAL IMPULSE NOISE", the contents of which are incorporated by reference.

FIELD

The present invention relates generally to protecting communication channels from noise. More particularly, the present invention relates to protecting communication systems from repetitive electrical impulse noise.

BACKGROUND

Repetitive electrical impulse noise (REIN) can affect communication systems and can comprise a plurality of impulses, each impulse having a duration, wherein impulses are separated by regular time periods or intervals. Electric power lines carrying AC power are one mechanism that can cause REIN, wherein the REIN impulses typically appear with twice the frequency of the AC power. Depending on the country, typical AC power systems can have, for example, a frequency of 50 Hz or 60 Hz. Such AC power systems would result in REIN with a frequency of 100 Hz or 120 Hz, respectively, which corresponds to a REIN period of 10 ms or 8.33 ms, respectively. Further, such REIN impulses could have various durations, for example, in the range of approximately 50-500 μs or of approximately 1-2 ms. Although electric power lines are one mechanism that could cause REIN, countless other mechanisms could also do so.

Communication systems, including digital subscriber line (DSL) communication systems, can be severely affected by REIN. Specifically, DSL modems using discrete multi-tone (DMT) modulation (e.g., ADSL or VDSL) are affected severely by REIN because a single REIN burst may alter a complete DMT symbol. If REIN alters a complete symbol, a large number of bit-errors will occur. For example, if the length of a DMT symbol is 0.25 ms, then REIN could alter on average one in every 33.3 (for 120 Hz REIN frequency with period 8.33 ms) or one in every 40 (for 100 Hz REIN frequency with period of 10 ms) DMT symbols. This error rate may not meet the quality of service requirements for DSL systems.

FIG. 1 shows one known communication protocol 100 for providing communication service, wherein horizontal lines can indicate communication signals or messages exchanged between modems 102, 104 and over a twisted pair of copper wires 106. The illustrated communication protocol 100 includes several steps, which are further described below, namely: handshake 108, initialization 110, and data transfer 112.

In step 108, the modems can undergo a handshake, which is somewhat analogous to two people shaking hands and introducing themselves when they first meet. The handshake serves to identify the type of modems in communication, and to negotiate and agree on a common set of initial communication parameters (e.g., bit distribution parameters) for the communication service, wherein handshake messages are sent from one modem to the other to facilitate the negotiation and agreement of the common set of communication parameters. In one embodiment, the handshake may be carried out in accordance with ITU-standard G.994.1.

After the handshake, the modems can continue on to an initialization in step 110. The initialization can include a message exchange and the capture of channel parameters (e.g., channel estimation, signal-to-noise ratio estimation, calculation of coefficients of the equalizer and echo canceller). In a typical situation, the signal-to-noise ratio (SNR) for each sub-carrier is measured during system initialization, and the maximum bit capacity of each sub-carrier is determined. Once the transmission capability of the system is thus assessed, the modems can assign more bits (e.g., larger constellation sizes) onto sub-carriers with higher SNR compared to sub-carriers having lower SNR and the sub-carrier relative transmit powers (e.g., gains) are set. Illustrative initializations are described in ITU-T recommendation G.992.1 (ADSL) or ITU recommendation G.993.2 (VDSL2).

After the initialization 110, the modems can transfer data in 112. In one known embodiment, the modems do not protect messages with impulse noise protection (e.g., FEC encoding, interleaving) until data transfer. In other words, although known DSL systems use impulse noise protection in data transfer 112, they do not use impulse noise protection in either the handshake 108 or initialization 110. Thus, known methods for protecting against REIN are not applicable during initialization.

In real-world situations REIN may be present all the time—even during the handshake or initialization stage of a communication protocol. However, the prior art fails to disclose a communication protocol that accounts for the presence of REIN prior to data transfer. Accordingly, the need exists for methods to detect the presence of repetitive electrical impulse noise (REIN) and for methods that limit the effects of repetitive electrical impulse noise.

SUMMARY

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

Aspects of the present invention relate to a method for limiting an effect of repetitive electrical impulse noise in a communication system. The presence of the repetitive electrical impulse noise is detected during a communication or training phase. If the repetitive electrical impulse noise is detected, then a message is transmitted which signals that the repetitive electrical impulse noise is present.

The following description and annexed drawings set forth in detail certain illustrative aspects and implementations of the invention. These are indicative of but a few of the various ways in which the principles of the invention may be employed.

DETAILED DESCRIPTION

Figure 1:
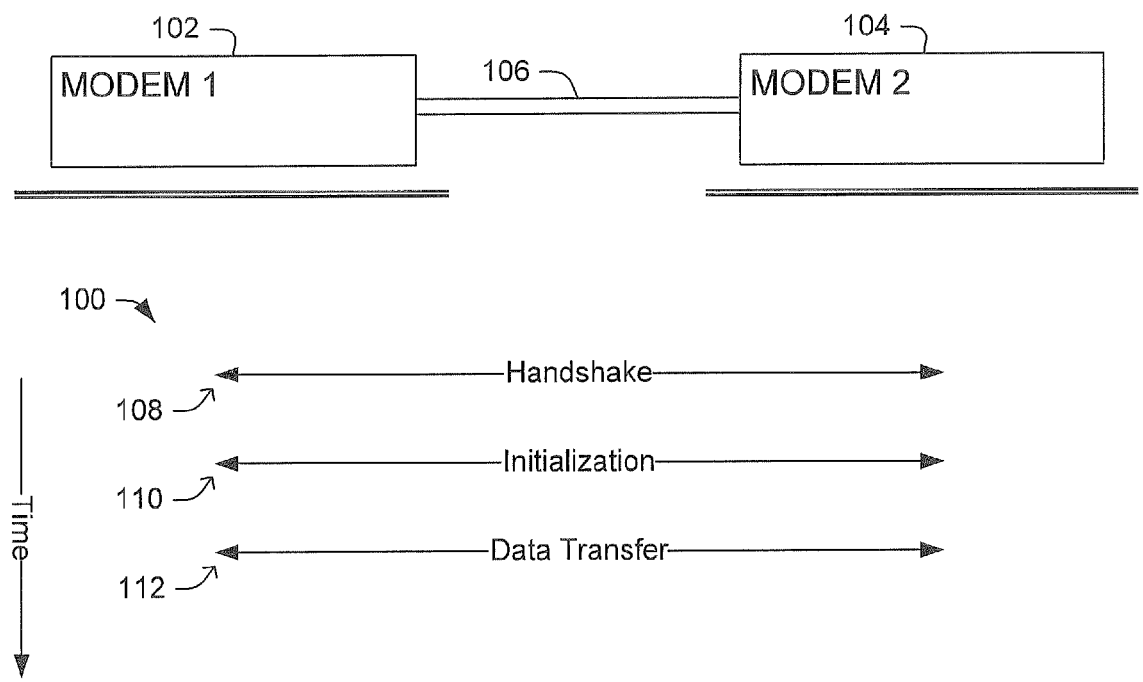
FIG. 1 is one known communication protocol for a DSL system.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Figure 2:
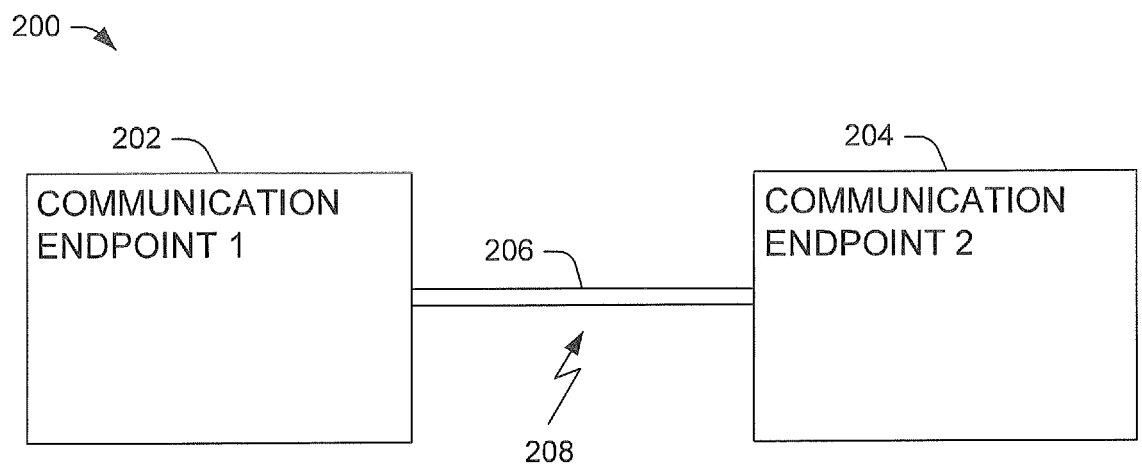
FIG. 2 is one embodiment of a communication system in accordance with the present invention.

FIG. 2 illustrates one communication system 200 in which one or more aspects of the invention may be implemented, comprising first and second communication endpoints 202 and 204, respectively, coupled to a communication channel 206, wherein data is transferred between the communication endpoints 202 and 204 over the communication channel 206. The invention may be employed in communications systems using any type of communication channel by which data can be transferred between communication endpoints or other endpoints of a communication system.

In one system, a first communication endpoint is adapted to detect a noise signal (e.g., REIN) with respect to data received on the communication channel from the second communication endpoint during communication service. The first communication endpoint analyzes the noise signal and selectively proposes appropriate noise protection parameters to the second communication endpoint to be used in subsequent communications. The communication endpoint and are adapted to cooperatively adjust impulse noise protection for data that is transferred between the first communication endpoint and the second communication endpoint.

The various components of the communication system 200 and other systems of the invention include suitable circuitry, state machines, firmware, software, logic, etc. to perform the various methods and functions illustrated and described herein, including but not limited to the exemplary methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 200 in FIG. 2) as well as in association with other systems not illustrated, wherein all such implementations are contemplated as falling within the scope of the present invention and the appended claims.

Figure 3:
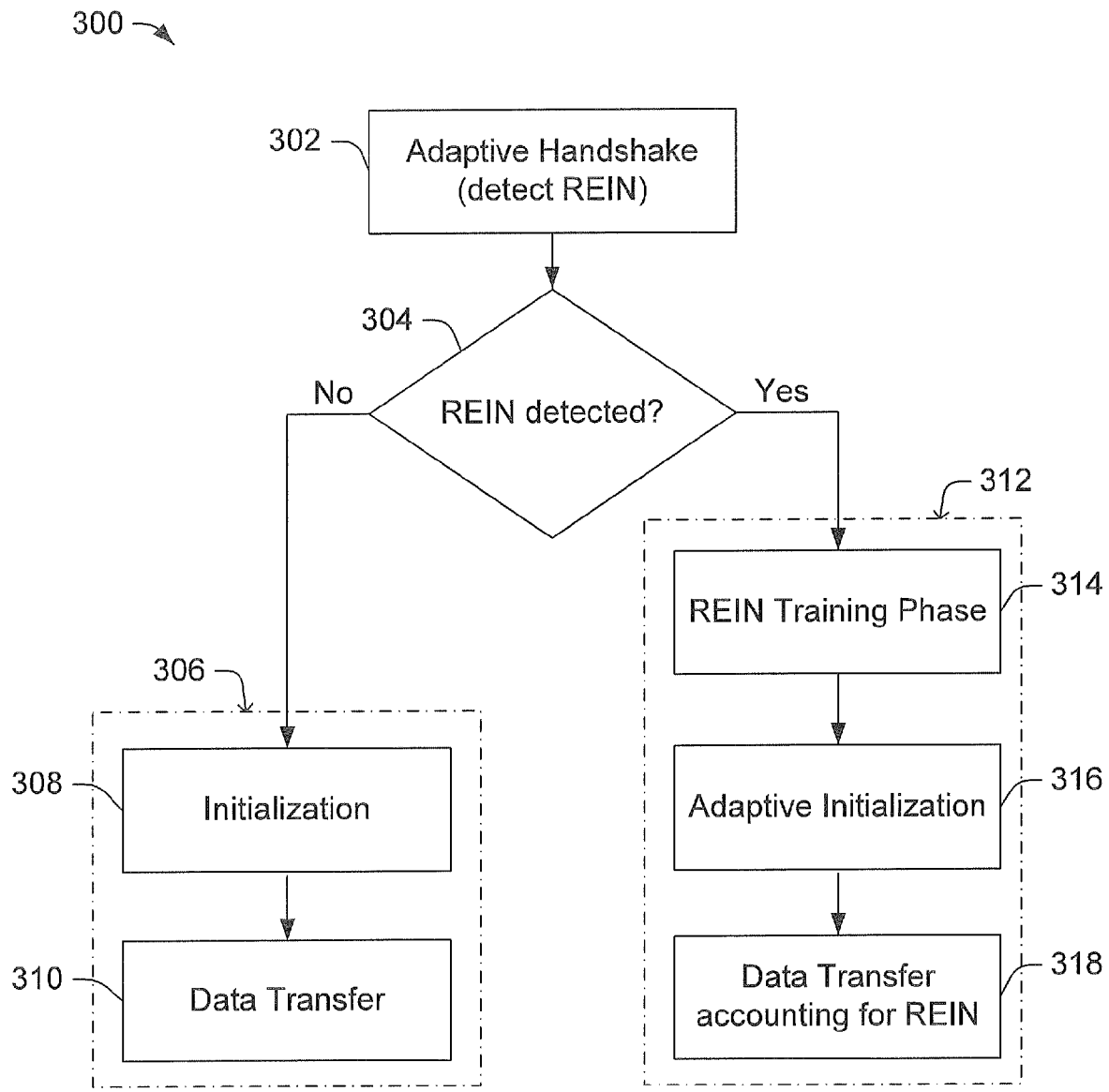
FIG. 3 is one embodiment of a communication method for limiting effects of REIN in a communication system.

FIG. 3 illustrates one communication method 300 for limiting the effects of REIN in a communication system. As shown, based on whether REIN is detected during the communication service, for example in an adaptive handshake 302, the method performs either a routine communication procedure 306 or an alternate communication procedure 312, wherein the alternate communication procedure 312 utilizes noise protection parameters based on the detected REIN.

In step 302, the endpointss 202 and 204 perform an adaptive handshake that includes the exchange of handshake messages. In addition to the features of the handshake 402 previously discussed with reference to FIG. 2, the adaptive handshake 302 may also serve to detect the presence of REIN. In one embodiment (discussed further herein with reference to FIG. 3), the adaptive handshake 302 includes a multi-time symbol detection technique using over-sampled transforms. In another embodiment, the endpoints communicate during the adaptive handshake 302 with relatively long symbols, wherein the relatively long symbols are not significantly disturbed by relatively short bursts of REIN.

If the endpoints do not detect REIN on the channel during the adaptive handshake (NO at 304) the endpoints follow a routine communication procedure 306, wherein the routine communication procedure 306 includes a routine initialization 308, and data transfer 310. Each of these steps (302, 308 and 310) can relate a step (108, 110, and 112, respectively) that was previously discussed with reference to FIG. 1.

If an endpoint detects REIN on the channel during the adaptive handshake (YES at 304), then an alternate communication procedure 312 is followed, wherein the alternate communication procedure 312 can include a REIN training phase 314, an adaptive initialization 316, and data transfer accounting for REIN 318. To initiate the alternate communication procedure 312, the detecting endpoint may transmit a message to the non-detecting endpoint, wherein the message indicates that REIN is present on the channel. In various embodiments, the detecting endpoint transmits the message over the channel to the non-detecting endpoint in the adaptive handshake 302, while in other embodiments the detecting endpoint transmits the message at another step in the alternate communication procedure 312 (e.g., the REIN training phase 314, the adaptive initialization 316, or data transfer 318). In one embodiment, the message can inform the second endpoint that the adaptive handshake is to be followed by the REIN training phase 314.

In the REIN training phase 314, one endpoint identifies REIN characteristics and associated REIN parameters and communicates those REIN parameters to another endpoint. Thus, after exchanging the REIN parameters in the REIN training phase, both endpoints know of the presence and characteristics of the REIN. The REIN training phase may use the same signals as the adaptive handshake (e.g., an oversampled FFT). In various embodiments, all or portions of the REIN training phase may be incorporated into the adaptive handshake. One embodiment of the REIN training phase is discussed further herein with reference to FIG. 6.

After completing the REIN training phase 314, the method 300 proceeds to step 316 where adaptive initialization is performed. In addition to those features of the initiation 104 previously discussed with respect to FIG. 1, the adaptive initialization can also account for the detected REIN, for example as discussed further herein with respect to FIGS. 7A-7B.

After completing the adaptive initialization in step 316, the endpoints transfer data in step 318, wherein the data transfer accounts for the presence of the REIN and suitably adjusts communication to limit the effect of the REIN. For example, in one embodiment wherein the endpoints are modems, the modems may select framing and FEC parameters which provide sufficient protection of the data transfer against REIN bursts. Alternatively, to adjust the communication to limit the effect of REIN, the modems can use other techniques described in any of the following references in coordination with the teachings of the present application: (1) BT, "Performance of various ADSL CPE in presence of 100 Hz repetitive impulse noise", ITU SG15/Q4 contribution D-159, Lake Tahoe, Calif., August 2004; (2) SBC, Bell Canada, BellSouth, MCI, "Impulse Noise Mitigation for Transport of Triple-play Services", ITU SG15/Q4 contribution HA-030, Huntsville, Ala., March 2005; or (3) 2Wire, "Proposal for impulse noise protection scheme in VDSL2", ITU SG15/Q4 contribution SI-045, Stresa, Italy, October 2004.

Figure 4:
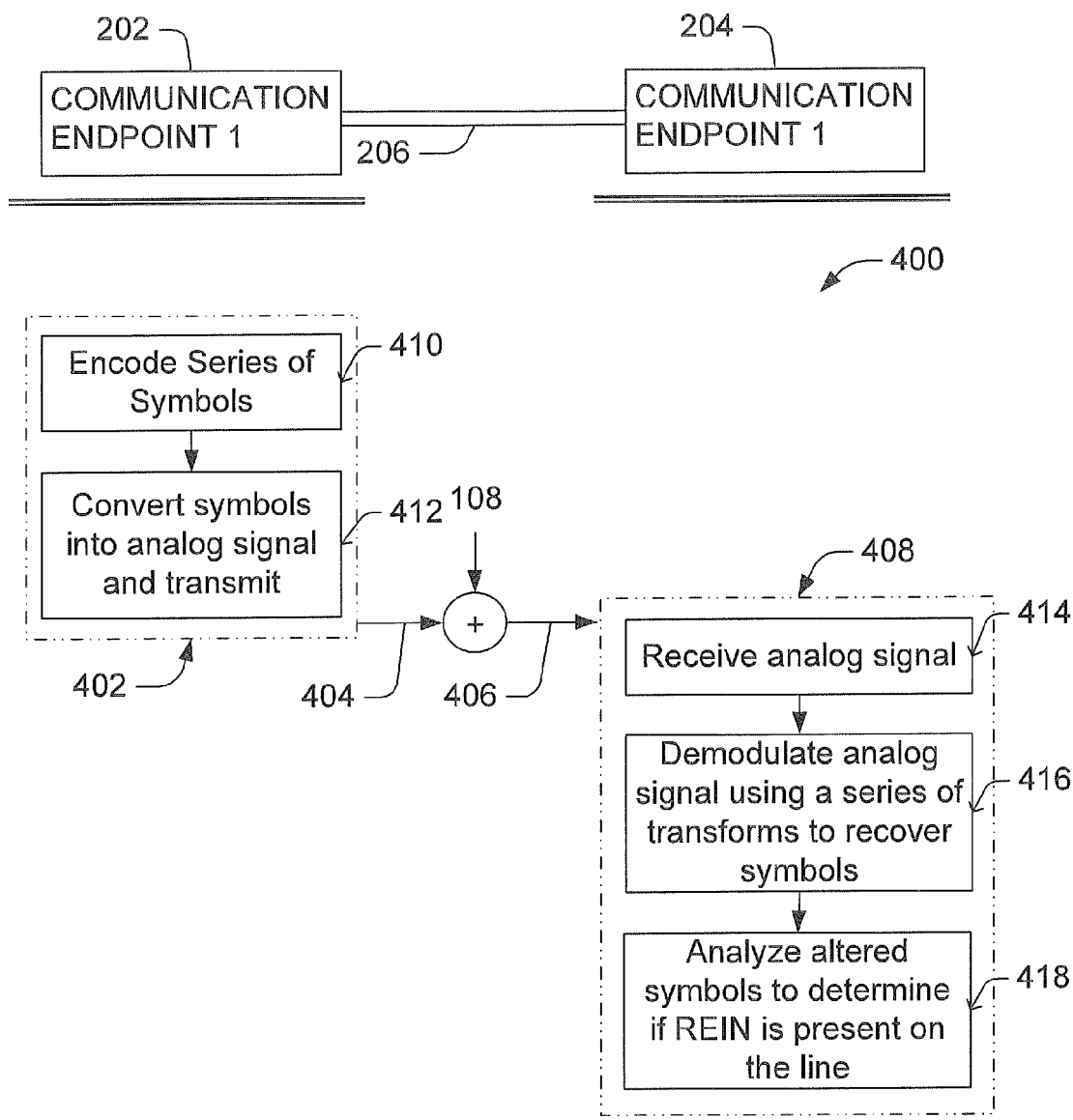
FIG. 4 one embodiment of a method for detecting REIN signal in a communication system.

FIG. 4 illustrates one adaptive handshake 400 that can detect the presence of REIN. In the illustrated adaptive handshake 400, at step 402 a first endpoint 202 prepares and transmits analog data 404 across a communication channel 206 to a second endpoint 204. A noise signal 108 (e.g., REIN) may alter the transmitted analog data 404 to create altered analog data 406. In step 408, a second endpoint 104 receives and analyzes the altered analog data 406 to detect the presence of REIN.

A message M is encoded as one of a series of symbols (410), for example, via a one-to-one mapping performed by an encoder. Each symbol can be an N-dimensional (possibly complex) vector. In one embodiment, a predetermined number of bits from the message are encoded as a symbol by n bit-to-symbol encoder. For example, an 8-PSK modulator modulates one of eight symbols onto the channel, thus, the bit-to-symbol encoder associated with an 8-PSK modulator generates a symbol for every three input bits.

In step 412, the symbols are converted into an analog signal that is transmitted on the channel 206. The symbols are converted into the analog signal by using modulation, which is the process of converting each successive data symbol into an analog signal that represents the message corresponding to each successive block of bits. Various types of modulation may be employed including but not limited to linear modulation and non-linear modulation. In one embodiment, each successive data symbol vector may be modulated by using an inverse discrete Fourier transform (IDFT)). In an embodiment utilizing the G.994.1 handshake, handshake signals combined from several (three or more) tones are modulated using Differential Phase Shift Keying (DPSK) to produce a low symbol rate. Due to the low symbol rate, each modulated handshake symbol typically has a length that is much longer than the duration of the REIN impulses. Due to the long symbols, several decoding methods can receive the long symbols error-free in the presence of REIN. In various embodiments, averaging or integration could be used to decode the long symbols. In other embodiments, multi-detection methods could be used, wherein long symbols are received by parts and wherein merely parts that are unaffected by REIN are counted.

As further illustrated in FIG. 4, electrical noise 108 may affect the transmitted analog signal (404) to create an altered analog signal (406). The electrical noise 108 may include REIN, although the present invention is applicable to other types of noise, including but not limited to: Gaussian noise and white noise. If present, the REIN may comprise a plurality of impulses, each impulse having a duration, wherein impulses are separated by regular time periods or intervals.

In FIG. 4's illustrated method 400, the step of receiving and analyzing data 408 may comprise the sub-steps of: receiving an altered analog signal (414); demodulating the altered analog signal with one or more transforms to recover one or more altered symbols (416); and analyzing the plurality of altered symbols to detect whether the REIN is present on the channel (418).

In sub-step 416, the altered analog symbol is demodulated using a series of transforms to recover one or more altered symbols. In one embodiment, each modulated handshake symbol is demodulated with several transforms, where each transform is used to decode a non-overlapping part of the modulated handshake symbol. For example, a modulated handshake symbol can be demodulated with several fast-Fourier transforms (FFTs). Typically, the first endpoint provides the modulated handshake symbol at plurality of tones with a pre-determined tone spacing. For example, ITU-T recommendation G.994.1 includes a modulation tones with spacing of multiples of 4.3125 kHz. The second endpoint can then demodulate the modulated handshake symbol with a series of FFTs, wherein each modulation tone spacing is an integer multiple of each demodulation tone spacing. This may be expressed by the following relation:

$$M = k * D_k$$

where M is a unique modulation tone spacing, $D_k$ is a series of demodulation tone spacings, and k is an integer (k=0, 1, 2, 3, ... N). By demodulating the modulated handshake symbol with demodulation tone spacings that are an integer multiple of the modulation tone spacing, one can more accurately detect the presence of the REIN on the channel.

Figure 5:
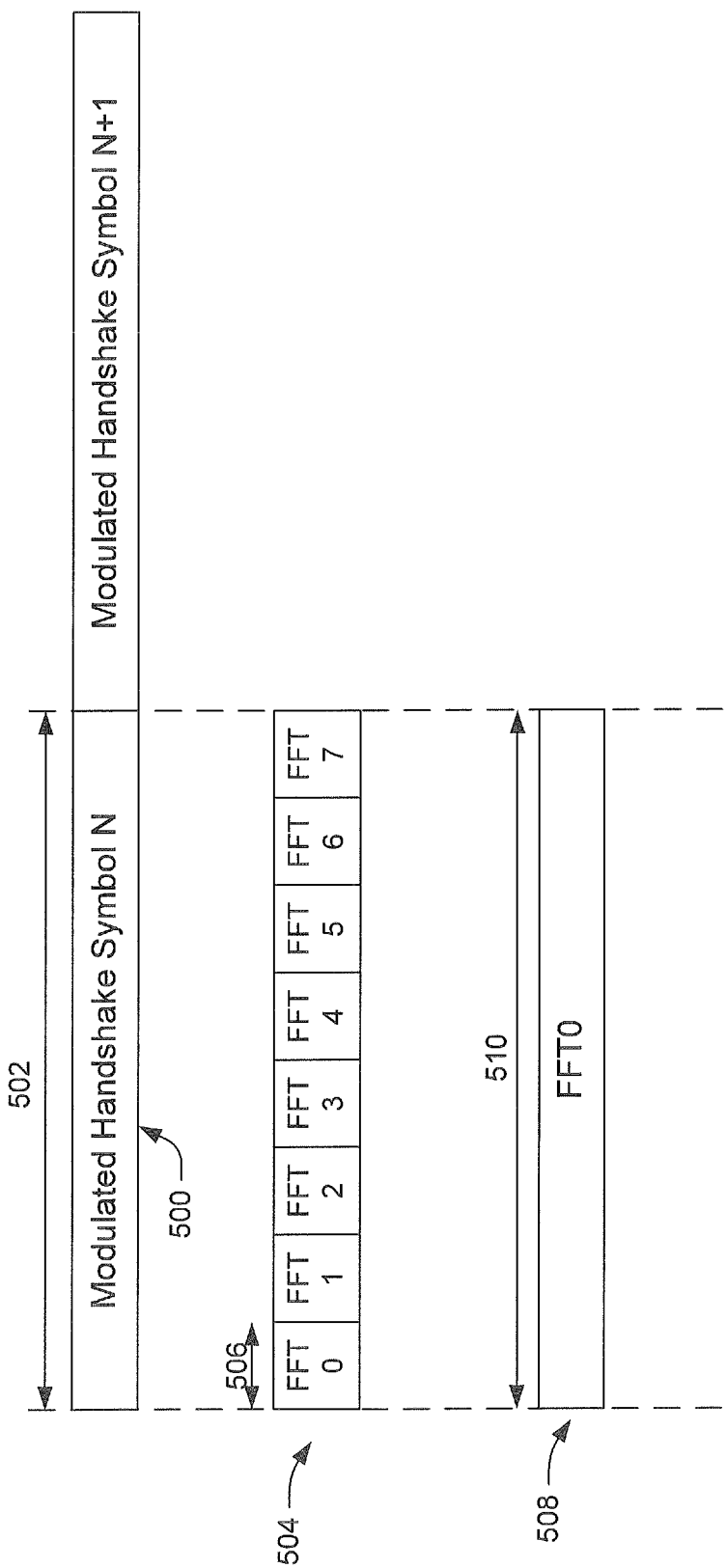
FIG. 5 is one embodiment for oversampling a modulated handshake symbol.

This concept is now described with reference to FIG. 5 and with numerical values that may be implemented in the receiver for handshake signal defined in ITU-T recommendation G.994.1, which include a modulation tone spacing of 4.3125 kHz. As shown, the modulated handshake symbol 500 has a duration 502 that relates to the symbol rate. For example, if the first endpoint transmits handshake symbols at a rate of 539.0625 symbols per second, then the duration of each handshake symbol would be approximately 1.855 ms. As reference numeral 504 shows, the second endpoint could demodulate the modulated handshake symbol 500 with eight FFTs (FFT0, FFT1, ..., FFT7). Further, each FFT could have sixty-four points and a demodulation tone spacing of 4.3125 kHz, which corresponds to a period 506 of 0.23188 ms. As reference numeral 508 shows, the second endpoint could also demodulate the modulated handshake symbol 500 with one FFT having five-hundred-and-twelve points and a tone spacing of 0.539 kHz, which corresponds to a period 510 of 1.855 ms. Other combinations would also be possible where the tone spacing is other than 4.3125 kHz. For both illustrated cases, the sampling rate will be the number of points multiplied by the tone spacing (i.e., 64*4.3125 kHz=276 kHz, and 512*0.539 kHz=276 kHz, respectively). The sampling rate need not be constant, but rather may vary with memory requirements, processing capabilities, and any other number of factors. By varying the tone spacing and number of FFTs, one can balance time-duration and frequency resolution. The above-described technique using over-sampled FFT may be enhanced when used in combination with impulse burst detection at the receiver.

Referring again to FIG. 4, in sub-step 418 the altered symbols are analyzed to determine whether electrical noise exists. For example, consider the case where symbols are transmitted such that upon receipt all parts of the symbol should have the same value (e.g., all 0s or all 1s). If no REIN is present, then all parts of the received symbol should have in the same value. By contrast, if all parts of the symbol do not result in the same value, then the DSL system can know the characteristics of the REIN. The process of deciding which altered symbol is closest to a known symbol is known as detection. In one embodiment, the method of detection is decision by majority, which can provide the value of the transmitted symbol from the altered symbol. In other embodiments, the detection may be a maximum likelihood detector or some other type of detector.

Thus, by demodulating handshake symbols with several FFTs, and by analyzing the demodulated symbols, it will be appreciated that method 400 can detect the presence of REIN.

As previously discussed in FIG. 3, if REIN is detected in the adaptive handshake 302, then the endpoints may enter a REIN training phase 508. One illustrative embodiment of the REIN training phase is now discussed with reference to FIG. 6. In the illustrated REIN training phase 600, one endpoint detects the REIN and communicates characteristics of the REIN to another endpoint, thereby allowing the endpoints to communicate in subsequent communication in a manner that limits the effects of the detected REIN signal. The detected and transmitted characteristics of the REIN may include, but are not limited to: period or frequency of the REIN impulses, the time at which the REIN impulses occur, the duration of the REIN impulses, and power of the REIN impulses.

Figure 6:
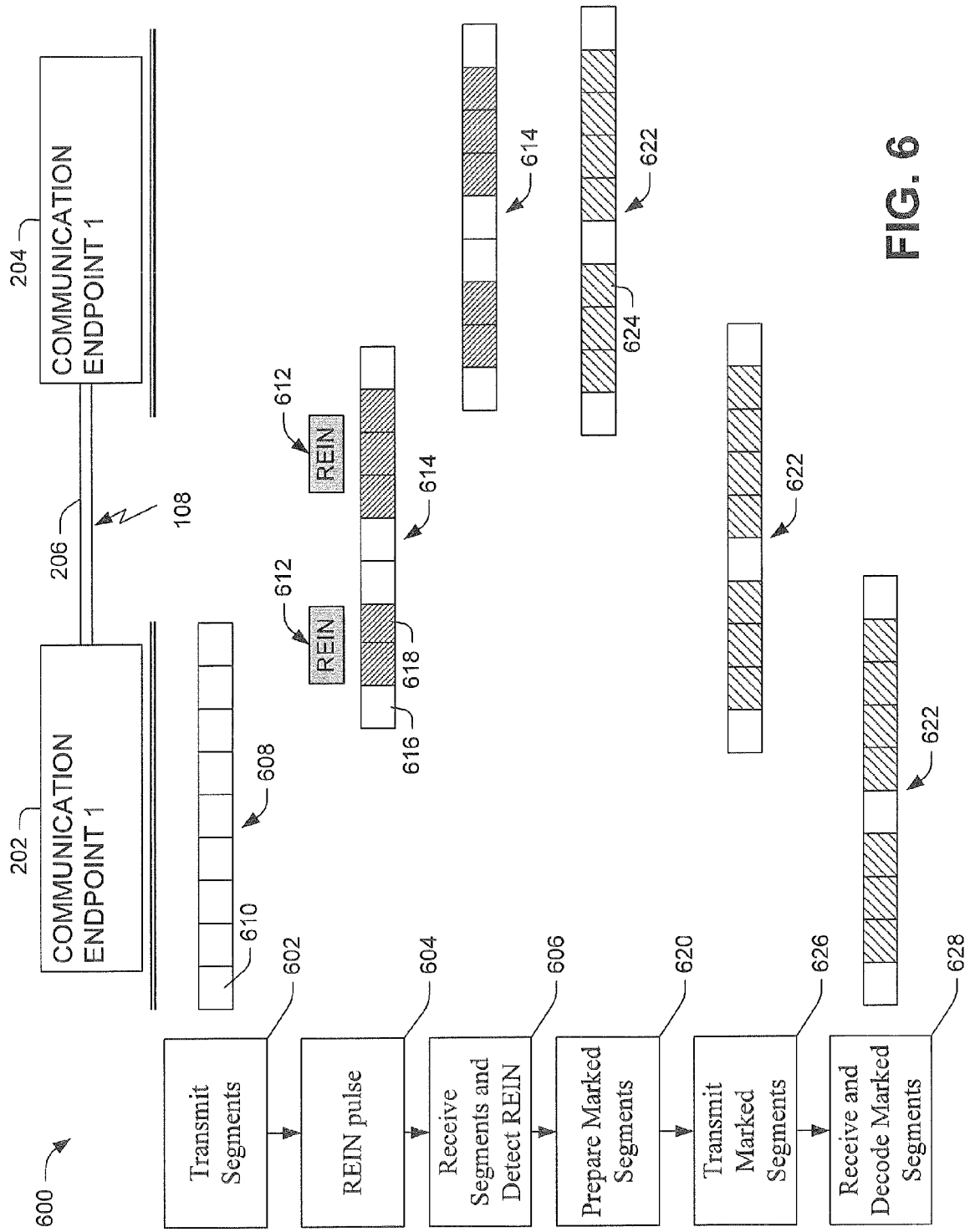
FIG. 6 is one embodiment for communicating REIN parameters over a DSL communication system.

In FIG. 6, flowchart elements (602, 604, 606, 620, 626, and 628) relate to the elements horizontally opposed thereto. As previously mentioned, in various embodiments, one or more of the elements (602, 604, 606, 620, 626, and 628) may take place at other steps in the communication service, for example, during the adaptive handshake 302 or adaptive initialization 316. During the REIN training phase, the endpoints can use the previously described over-sampled FFT technique as described with reference to FIG. 5.

In step 602 a first endpoint 102 transmits a message M over the channel 206, wherein the message M may be divided into one or more segments. One segment 608 may represent all of or a portion of message M. In addition, segment 608 includes one or more symbols (e.g., 610) which are transmitted across the channel 206.

In step 604, as each segment is transmitted along the channel 206, REIN 612 creates an altered segment 614. Specifically, the REIN 612 can create an altered segment 614 that comprises unaltered symbols (e.g., 616) and altered symbols (e.g., 618), wherein the altered symbols correspond to the period and duration of the REIN 612. The altered segment 614 represents all of or a portion of an altered message M'. Depending on the extent to which the REIN 612 affects the altered symbols 618 of the altered segment 614, the altered message M' may differ from the transmitted message M.

In step 606, the altered segment 614 is received at a second endpoint 104, which analyzes the altered segment 614 to determine if REIN 612 is present on the channel 206 and, if the REIN 612 is present, to determine the characteristics of the REIN 612. In one embodiment, the method of REIN detection may be one of the methods of detecting REIN previously discussed.

In step 620, the second endpoint 104 prepares one or more marked segments 622. Each marked segment 622 comprises one or more marked symbols (e.g., 624) that are coded such that the first endpoint 102 can decode the marked segments 622 to discern the REIN characteristics. One of numerous transmission protocols could be used to create the marked segments 622. Although three such protocols are described below, the present invention contemplates other transmission protocols as falling within the scope of the invention.

In one transmission protocol, the location of each impulse of the REIN 612 could be marked by transmitting alternately 0 and 1 and changing the order where the REIN impulse is detected.

In another transmission protocol, the marked segments will comprise symbols that carry the same information (e.g., 1 or 0), which is the same as the information carried by the symbol directly prior to the first altered symbol and opposite to the information carried by the last altered symbol. Due to continuous transmission of marked symbols during sufficient time (usually ten or more expected REIN periods), the protocol is not affected by the case when one or more marked symbol is altered by the noise in the channel.

Another transmission protocol sends the same information (e.g., 0) on all symbols until no altered symbol arrives, then changes the information at the first symbol carrying the REIN mark (to 1), keeps transmitting the same information during the REIN mark, and changes it back (to 1) after the last symbol carrying the REIN mark.

In step 626, each marked segment 622 is transmitted from the second endpoint 104 to the first endpoint 102. Because REIN may affect the marked segments (not illustrated), in various embodiments, the second endpoint 104 may transmit the marked segments to the first endpoint 102 numerous times and the first endpoint 102 may receive the marked segments numerous times, wherein the number of times the segments are transmitted and received is engineered such that the first endpoint can accurately determine the values of the marked segments transmitted from the second endpoint 104.

In step 628, the endpoint 102 will receive the marked segment 622 and will track the marked segments to estimate the time period of the REIN, its time location, and the duration of REIN impulses. As the duration of a REIN impulse is typically longer than the latency of the channel, the latency may be neglected in this process in various embodiments. In other embodiments, a REIN affected endpoint might add some guard time to the marked segments.

To maintain robustness of communication, the handshake messages and the messages used during the REIN training phase can use the same tones and noise detection techniques as used during the adaptive handshake. The symbol rate could be the same as during the adaptive handshake or it could be increased (e.g., by a factor of 8) to improve the accuracy of detecting the altered symbols. In some cases (e.g., those described below with respect to adaptive initialization), the exact knowledge of location of the REIN burst is not necessary, but only knowledge on REIN period and duration of REIN burst is needed. Those REIN parameters can coded and communicated to the endpoint at the other side as scalar values using one of the convenient message formats, for instance those used during the handshake procedure or the REIN training phase.

As previously discussed in FIG. 3, if REIN is detected in the adaptive handshake 302, the endpoints of the communication system may undergo a adaptive initialization. Illustrative embodiments of adaptive initialization are now described.

Three protocols are described herein to provide a robust message exchange during adaptive initialization: repetitive transmission, REIN-synchronized transmission, and adaptive forward error correction (FEC) transmission. Each of three proposed types of transmission may be supported by the REIN training phase as previously described.

In repetitive transmission, each endpoint uses short segments and repeats each segment one or more times. Both the first endpoint and the second endpoint know the number of repetitions to be utilized in the communication. If the length of each segment is selected properly, some of the segments will be transmitted from the first endpoint to the second endpoint without being adversely affected by the REIN. Thus, some of the segments will be transmitted error free.

Figure 7A:
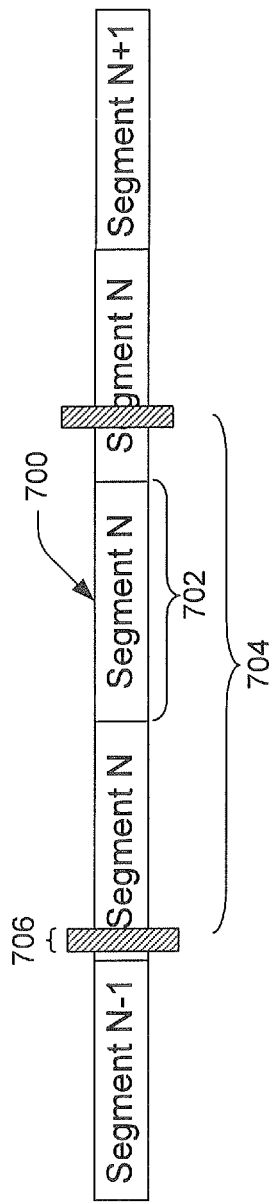
FIG. 7a and FIG. 7b each illustrate one embodiment for performing a adaptive initialization step.

One example of repetitive transmission is illustrated in FIG. 7A, wherein each segment 700 is sent three times consequently, and the length of each segment 702 is less than one-third of the difference between the REIN period 704 and the duration of the REIN impulse 706. In this case at least one of the three copies of the segment will be received error-free.

Figure 7B:
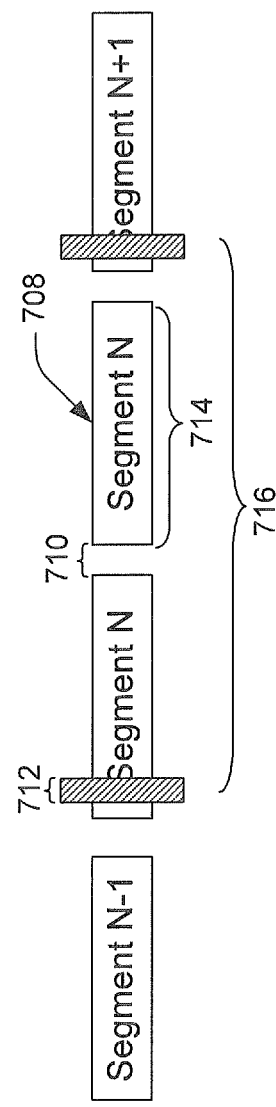

Another example of repetitive transmission is presented in FIG. 7B, wherein each segment 708 is sent twice, and a time delay 710 is inserted between segments. If the length of each segment 714 is less than half of the quantity of the REIN period 716 minus the duration of the REIN impulse 712 minus the time delay, at least one of the segments will be received error-free.

In another example of repetitive transmission (not shown), a long segment could be constructed that incorporates repeating information parts, so that segment overhead will not significantly impact the efficiency of communication as in case of very short segments.

With repetitive transmission in VDSL, the communication protocol in both Auto Reply (AR) and Repeat Requst (RQ) mode will not be disturbed by multiple re-transmissions. Thus, in various embodiments, REIN may result in reduction of the communication rate by slightly more that 2 times. Efficiency of the repetitive protocol could be increased if the endpoints know the characteristics of the REIN. The repetitive protocol doesn't require the knowledge of the exact timing of REIN, which simplifies the design. In addition, the receiver need not identify a corrupted segment by impulse burst detection, because those may be recovered using CRC. The receiver may be aware that the protocol is used, so that it can drop the repeated messages instead of sending a re-transmission request when a segment is corrupted. In another implementation, repetitive transmission could be combined with auto-repeat (AR) mode and repeat-request (RQ) modes.

Notice that simple repeating of the segments will not necessarily result in a reliable transmission. The duration and protocol should be accurately coordinated with parameters of REIN identified and communicated prior the message exchange.

REIN-synchronized transmission also can be used to achieve an error-free message exchange, thereby providing a high speed of communication in the presence of REIN. REIN synchronized transmission uses short segments that fit within the REIN period, then synchronizes the transmission of each segment with the REIN such that segments are transmitted between two consecutive REIN pulses. This method may completely avoid loss of segments due to REIN if the length of the segment is less than the time interval between REIN impulses. In one embodiment, the length of the segment is less than the quantity of the period of the REIN minus the duration of the REIN impulse.

Additional improvements to the SOC protocol are possible during the synchronized transmission. For example, in VDSL, each SOC message communicated to a REIN affected transceiver needs an acknowledgement message that it has been received correctly. As the REIN affected transceiver knows the timing of REIN, it can transmit the acknowledgement message between two REIN bursts, same way as communicated message was sent. Additionally in the SOC protocol, all SOC messages communicated to the REIN affected transceiver are additionally protected with a forward error correction (FEC). Also, the length of SOC messages can be longer than the REIN period, but during REIN bursts, the transmitter will insert dummy bytes or it will repeat the byte from the previous symbol ("Byte Blanking")

Forward error correction (FEC) can also be used to achieve an error free message exchange. Although traditional FEC deals with impulse noise, in the case of REIN a direct use of FEC is inefficient. Specifically, the format of the FEC should be very accurately set to fit the specific case of REIN parameters. Otherwise, there may be errors (e.g., due to insufficient correction capability) or there may be excessive overhead that slows communication. Therefore, both the transmitter and the receiver shall know the required FEC parameters (codeword length, redundancy) prior the initialization. This is done by communication of REIN parameters in the REIN training phase as previously discussed. Adaptive FEC provides sufficiently high efficiency and does not require synchronization to the REIN.

The signals and protocol for message exchange during the adaptive initialization between the two transceivers may depend on the specific DSL standard. For example, the VDSL standard uses a Specific Operation Channel (SOC) for message exchange.

In VDSL, the SOC messages are sent using a sequence of DMT symbols that each carry one or two bits of data. Each signal tone (sub-carrier) is modulated with QAM-4. To increase robustness, the same bit is repeated on several tones, so that the whole DMT symbol carries one or two bytes of SOC data, independent of the number of tones used. The length of a transmitted SOC message or transmitted segment is not longer than 1024 bytes. If the period of REIN is 8.33 ms (which corresponds to one possible half-period from a standard 50 Hz power line), and the duration of the DMT symbol is 0.25 ms, each 1024-byte segment will experience about 33 REIN bursts, which will result in error probability of $Pe=1-(1-P_S)^{33}$, where $P_S$ is the probability of error during the REIN pulse. If almost every REIN burst causes an SOC error, an error-free message exchange is not possible, absence countermeasures. Aspects of the present invention encompass numerous embodiments directed at alleviating this dilemma.

Figure 8:
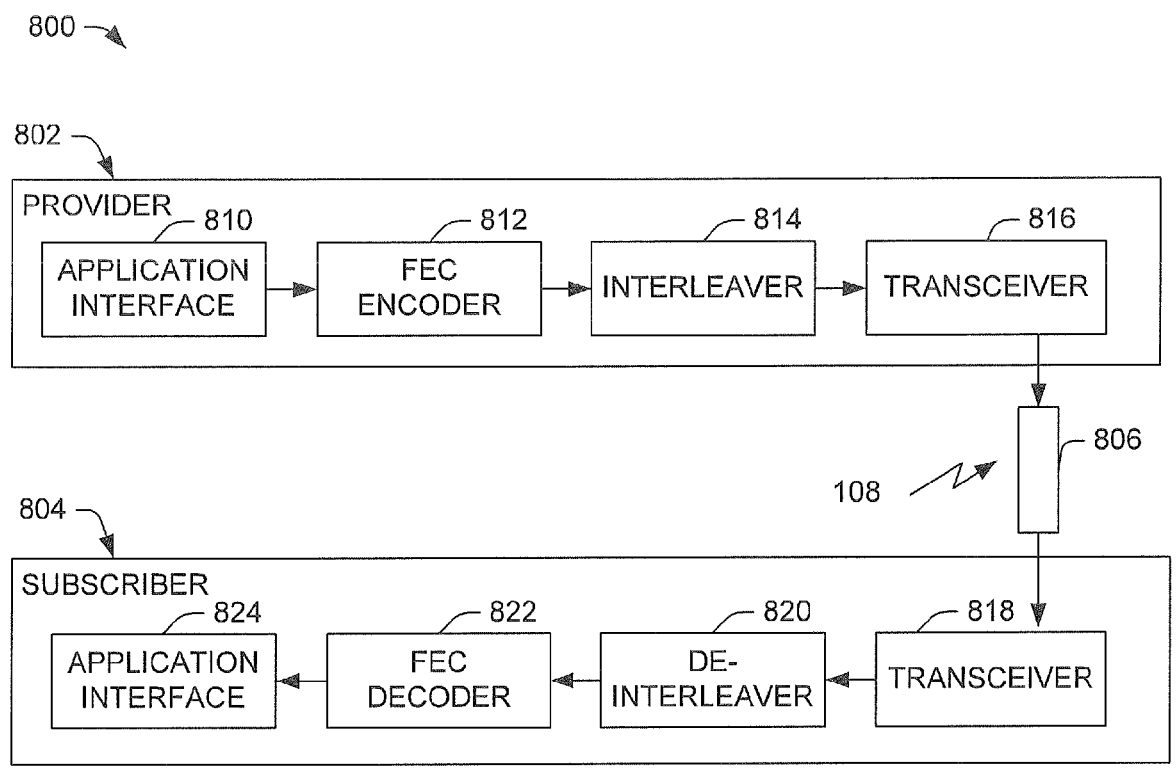
FIG. 8 is one embodiment of a multi-carrier DSL communication system.

FIG. 8 illustrates one embodiment of a communication system in which the communication endpoints 202 and 204 comprise DSL modems 802 and 804 having suitable circuitry for providing DSL communication service over a twisted copper pair 806. The illustrated DSL communication system 800 includes first and second DSL modems 802 and 804, respectively, coupled to a communication channel 206. A noise signal 108 (e.g., REIN) may affect data transmitted on the channel. One communication channel is a twisted pair of copper wires in a conventional residential telephone system, although the invention may be employed in communications systems employing any type of channel by which data can be transferred between the modems. In various embodiments, the communication channel may comprise the atmosphere or other fluid medium (e.g, in a wireless communication system). Exemplary modems are DSL modems having suitable circuitry for providing DSL communication service on the channel generally in accordance with ANSI T1.413 (ADSL), T1.524 (VDSL) and other DSL standards, including the performance of the tasks and functions described herein. In various embodiments (not shown), aspects of the invention may be utilized by a single modem operated in "loopback" mode, wherein the single modem both transmits data onto the channel and receives data from the channel for analysis.

In order to appreciate the various aspects of the invention, the illustrated system 100 and the various methods of the invention are hereinafter described with respect to data being transferred from the provider modem 802 to the subscriber modem 804 via the communication channel 806. Accordingly, in the following discussion, the first modem 802 may be referred to as a "transmitter" or an "initiator" and the second modem 804 may be referred to as a "receiver" or a "responder" for purposes of describing the various aspects of the invention. However, it will be appreciated that both modems 802 and 804 are capable of transmitting and receiving data in the illustrated implementation, and similarly that both modems 802 and 804 are capable of being an initiator and a responder. Thus, the first modem 802 may be a provider modem that is located at a DSL service provider premises, and the second modem 804 may be a subscriber modem that is located in a residential home, and vice versa.

As shown in FIG. 8, the first modem 802 includes an application interface 810 for interfacing to a host system. The application interface 810 is a construct for entering data into the system and for outputting data from the system. Typically, application data is provided at the application interface 810 as a number of blocks of data from which it will traverse various layers of the network stack.

A Forward Error Correction (FEC) encoder 812 generates a certain number of redundancy bytes for each block of data. Typical DSL modems will support Reed-Solomon forward error correction, and may support others in addition to or in substitution thereof.

After the addition of redundancy bytes, an interleaver 814 mixes the FEC codewords in a manner so as to limit the effects of impulse noise corruption. The interleaver 814 divides each codeword into smaller segments, and then mixes (interleaves) the segments in accordance with a predetermined algorithm to form an interleaved data stream. The algorithm for segment mixing may be such that segments belonging to the same FEC codeword are placed remotely from each other in the interleaved data stream. During transmission, the interleaving results in the segments of the same codeword being spread out over time, whereby impulse noise during any given short period of time results in corruption of only one or a few segments belonging to a particular codeword, causing fewer errors in each reassembled (e.g., de-interleaved) codeword at the receive side. Typical DSL modems will support convolutional/triangular interleaving, although they may support others in addition to or in substitution thereof.

After the FEC encoder 812 and interleaver 814 process the data, the transceiver 116 encodes the interleaved data stream as a series of symbols and then modulates the symbols onto the channel 806. After the modulated signals traverse the channel 206, the modulated signals are received at the second modem 804, specifically the transceiver 818 thereof, which includes suitable circuits for interfacing with the channel 806 and converting the modulated signals into digital data.

After the transceiver 818 provides the received data stream, the deinterleaver 820 un-mixes or de-interleaves the received data stream. The deinterleaver 820 includes buffer memory, wherein the buffer memory may introduce latency into the system. Depending on whether noise alters the data transmitted on the channel, the data of the received segments may or may not be equal to the data of the transmitted segments.

After the deinterleaver 820 reassembles the data, the FEC decoder 822 uses the redundancy bytes of each received FEC codeword for recovering or correcting a certain number of corrupted data bytes from each corresponding block of data. Thus, the FEC decoder 822 ensures that when a small number of bytes in a received codeword are corrupted, the original data transmitted in the codeword can be recovered from the data in the received codeword. Thus, increasing FEC redundancy (e.g., the number of redundancy bits) adds further FEC protection against impulse noise while effectively decreasing the data rate, and vice versa, wherein the goals of impulse noise protection and effective data rate involve a tradeoff.

Thus, FEC redundancy allows correction of a certain amount of corrupted data in each codeword. Further, interleaving helps reduce the amount of corrupted bytes in each individual codeword. By utilizing FEC redundancy and interleaving, DSL systems may effectively combat a given amount of impulse noise in the channel. Also, as discussed above, increasing FEC capabilities requires more redundancy bytes to be introduced, and reduces the effective data rate.

In addition to the illustrated components, each modem 802 and 804 also includes a local management system (not shown), which provides control parameters and settings to the FEC encoder 812 and decoder 122, the interleaver 814 and deinterleaver 120, and the transceivers 816 and 818. For example, each local management system can provide FEC parameters to the FEC encoder or decoder, wherein the FEC parameters relate to the number of redundancy bytes to be used. Further, each local management system can provide IL parameters to the interleaver or deinterleaver, wherein the IL parameters relate to the amount or level of interleaving thereof. Further, each local management system can also provide the bit distribution settings or parameters, including sub-carrier bit allocations, gain settings, etc. for decoding and demodulation of the incoming data received from the channel 806. The local management systems of the first and second modems 802 and 804, respectively, exchange control information and messages with one another via a local management channel, such as one of the sub-carriers of the channel 806 using any suitable communication or data exchange protocol, so as to coordinate parameters settings, rate adjustments, timing of changes, etc.

Although the communication system 100 and several of its components has been described above, it will be appreciated that the present invention includes countless other variations that are contemplated as falling within the scope of the invention.

For example, in various embodiments, a communication channel 206 can comprise wireline communication channel(s) including, but not limited to: wire transmission lines (e.g., twisted pair of copper wires), cable transmission lines (e.g., coax cable), and optical transmission lines. Other illustrative communication channels could include wireless communication channels, or combinations of wireline and wireless communication channels. Further, illustrative communication channels could support single-frequency communication or multi-frequency communication.

In addition, the communication endpoints could manifest themselves in various forms, depending on the implementation. For example, in one embodiment, one communication endpoint could be located at a customer's residence in the form of a residential gateway (RG) or a DSL modem (CPE), while another communication endpoint could be a DSL modem located at a central office (e.g., CO) that distributes data to multiple CPE modems. In one embodiment, a communication endpoint could comprise another electronic device, including but not limited to: a computer, a television or another video system, a videoconferencing device, a refrigerator, a camera, a music player, a fax machine, a cell phone, a home or office phone, and other digital devices.

Although the invention has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A system for determining impulse noise protection characteristics, the system comprising:
a communication endpoint configured to receive a plurality of symbols during a handshake portion of a communication, wherein the handshake is followed by one or more training phases, and to determine characteristics of a repetitive electrical impulse noise based on the plurality of symbols.

2. The system of claim 1, wherein the communication further includes an adaptive initialization phase following the training phase and includes a data transfer phase following the initialization phase.

3. The system of claim 2, wherein the communication endpoint is further configured to adapt the handshake portion according to the characteristics of the repetitive electrical impulse noise.

4. The system of claim 3, wherein the data transfer phase is adapted by the communication endpoint to account for the characteristics of the repetitive electrical impulse noise.

5. The system of claim 1, further comprising a communication channel configured to provide the communication.

6. The system of claim 5, further comprising another communication endpoint configured to provide the plurality of symbols to the communication endpoint during the handshake portion of the communication.

7. The system of claim 1, wherein the communication endpoint is further configured to demodulate an altered analog signal with a plurality of transforms to receive the plurality of symbols.

8. A system for determining impulse noise protection characteristics, the system comprising:
a communication endpoint configured to receive a plurality of symbols during a handshake portion of a communication and to determine characteristics of a repetitive electrical impulse noise based on the plurality of symbols,
wherein the communication endpoint is further configured to determine the characteristics of the repetitive electrical impulse noise during the handshake portion of the communication.

9. A system for utilizing impulse noise protection characteristics, the system comprising:
a communication endpoint configured to receive characteristics of a repetitive electrical impulse noise during an adaptive handshake portion of a communication, the communication comprising the adaptive handshake portion followed by a training phase.

10. The system of claim 9, wherein the communication further comprises an initialization portion following the training phase and a data transfer portion following the initialization portion.

11. The system of claim 10, wherein the communication endpoint is further configured to adapt the initialization portion to account for the characteristics of the repetitive electrical impulse noise.

12. The system of claim 11, wherein the communication endpoint is further configured to adapt the data transfer portion to account for the characteristics of the repetitive electrical impulse noise.

13. The system of claim 9, further comprising another communication endpoint configured to receive to determine the characteristics of the repetitive electrical impulse noise during the handshake portion of the communication.

14. The system of claim 13, wherein the another communication endpoint is further configured to transmit a message that includes the characteristics of the repetitive electrical impulse noise and the communication endpoint is further configured to receive the message.

15. The system of claim 9, wherein the communication endpoint is further configured to determine the characteristics of the repetitive electrical impulse noise during the handshake portion of the communication.

16. A method for determining impulse noise protection characteristics, the method comprising:
obtaining a communication having a handshake portion followed by a training phase at a communication endpoint device;
receiving a plurality of symbols from the communication during the handshake portion at the communication endpoint device; and
determining characteristics of a repetitive electrical impulse noise based on the plurality of symbols using the communication endpoint device.

17. The method of claim 16, further comprising receiving an analog signal carrying the plurality of symbols.

18. The method of claim 17, wherein receiving the plurality of symbols comprises demodulating the analog signal with a plurality of transforms.

19. The method of claim 18, wherein determining the characteristics of the repetitive electrical impulse noise comprises analyzing the plurality of symbols to detect an altered symbol.

* * * * *